(No Model.) 9 Sheets—Sheet 1.
J. H. R. WHINFIELD & J. HORNE.
GUN CARRIAGE OR MOUNTING.

No. 478,899. Patented July 12, 1892.

FIG.1.

(No Model.) 9 Sheets—Sheet 2.

J. H. R. WHINFIELD & J. HORNE.
GUN CARRIAGE OR MOUNTING.

No. 478,899. Patented July 12, 1892.

(No Model.) 9 Sheets—Sheet 3.
J. H. R. WHINFIELD & J. HORNE.
GUN CARRIAGE OR MOUNTING.
No. 478,899. Patented July 12, 1892.

FIG. 2.

(No Model.) 9 Sheets—Sheet 4.

J. H. R. WHINFIELD & J. HORNE.
GUN CARRIAGE OR MOUNTING.

No. 478,899. Patented July 12, 1892.

(No Model.) 9 Sheets—Sheet 5.
J. H. R. WHINFIELD & J. HORNE.
GUN CARRIAGE OR MOUNTING.
No. 478,899. Patented July 12, 1892.

(No Model.) 9 Sheets—Sheet 6.

J. H. R. WHINFIELD & J. HORNE.
GUN CARRIAGE OR MOUNTING.

No. 478,899. Patented July 12, 1892.

Fig. 8.

(No Model.)

J. H. R. WHINFIELD & J. HORNE.
GUN CARRIAGE OR MOUNTING.

No. 478,899.

Patented July 12, 1892.

UNITED STATES PATENT OFFICE.

JOHN HENRY RICHARD WHINFIELD AND JAMES HORNE, OF LONDON, ENGLAND.

GUN CARRIAGE OR MOUNTING.

SPECIFICATION forming part of Letters Patent No. 478,899, dated July 12, 1892.

Application filed February 10, 1891. Serial No. 380,896. (No model.)

*To all whom it may concern:*

Be it known that we, JOHN HENRY RICHARD WHINFIELD and JAMES HORNE, engineers, subjects of the Queen of Great Britain, and residents of London, England, have invented certain new and useful Improvements in Gun Carriages or Mountings, of which the following is a specification, reference being had to the accompanying drawings.

Our invention relates to gun-mountings for high-angled firing, chiefly designed for mortars or howitzers, and comprises new and improved means for moving or adjusting the gun to and between the loading and firing positions. Guns of this class are usually fired at angles of not less than forty-five degrees of elevation to obtain a plunging fire. If breech-loading, the gun must be so arranged that for loading it can be brought to or nearly to a horizontal position to allow the convenient manipulation of the breech mechanism, and if muzzle-loading it should, to avoid exposure of the men, be brought to about a horizontal position for loading. Therefore, whether the gun be breech or muzzle loading provision must be made for moving it from the firing to about a horizontal position and from this position through any angle to the firing position. In some instances the movement or adjustment of the gun from the loading to the firing position has been effected by turning the gun upon its trunnions through the whole angle of movement, the gun being arranged to recoil along a fixed slide at an angle which is about the mean of all the firing angles—that is to say, the slide is so fixed that the axis of the gun intersects the arc of fire at about the middle of the same; but this arrangement causes a great strain upon the slide and other parts of the mounting during the recoil. In other instances the gun in recoiling slides in a cradle or frame having trunnions about which the gun and cradle are turned together for elevation. Again, the cradle or recoil portion of the upper carriage has been arranged to move upon a slide along the chord of the arc of a circular segment or segmental frame arranged to turn about its center in arc-shaped bearings. Examples of these segmental frame gun-mountings are described in the specification of United States Letters Patent No. 410,968, dated September 10, 1889, granted to J. B. G. A. Canet. Both of these last-named arrangements afford the advantage of recoil in the line of fire at all firing angles, and consequent diminished stresses on the mounting; but it involves the adjustment of the gun-cradle and slide from the firing to the loading position, or vice versa.

By our present invention we provide for the recoil of the gun in the line of fire at any firing angle and obtain the additional advantage of greatly facilitating the work of adjusting the gun from the loading position to the firing angle, or vice versa.

Our said invention consists, chiefly, in the improved means hereinafter described and claimed for adjusting or moving the gun to and from its loading and firing positions, whereby a gun in a carriage or mounting, substantially such as is described in the aforesaid Patent No. 410,968, can be moved about its trunnions independently of the cradle and slide from the loading position to the lowest firing angle, and thence to any higher firing angle with the said cradle and slide, the result being a considerable saving of time and labor in elevating the gun.

In the accompanying drawings, Fig. 1$^a$ is a detail of Fig. 1, showing in section a by-pass valve hereinafter referred to. Fig. 5 is a longitudinal central section of the hydraulic elevating-cylinder. Fig. 6$^a$ is a detail view of the mechanism for locking the gun in its retracted position until the proper time for moving said gun out. Fig. 6$^b$ is a detail view of the means for preventing the gun from turning on its trunnions until it is fully retracted. Fig. 7 is a vertical central longitudinal section; Fig. 8, a vertical transverse section, and Fig. 9 a plan, partly in horizontal section, showing a modification of our invention. Fig. 8ª is a view similar to Fig. 8, showing in section a swivel-joint hereinafter described.

Like letters of reference indicate corresponding parts throughout the drawings.

A is a base-plate or racer.

B is the turn-table or platform, which is supported on the base-plate through the medium of a live roller-ring A' and is kept from tilting by means of hooks or clips B'.

Figure 2:
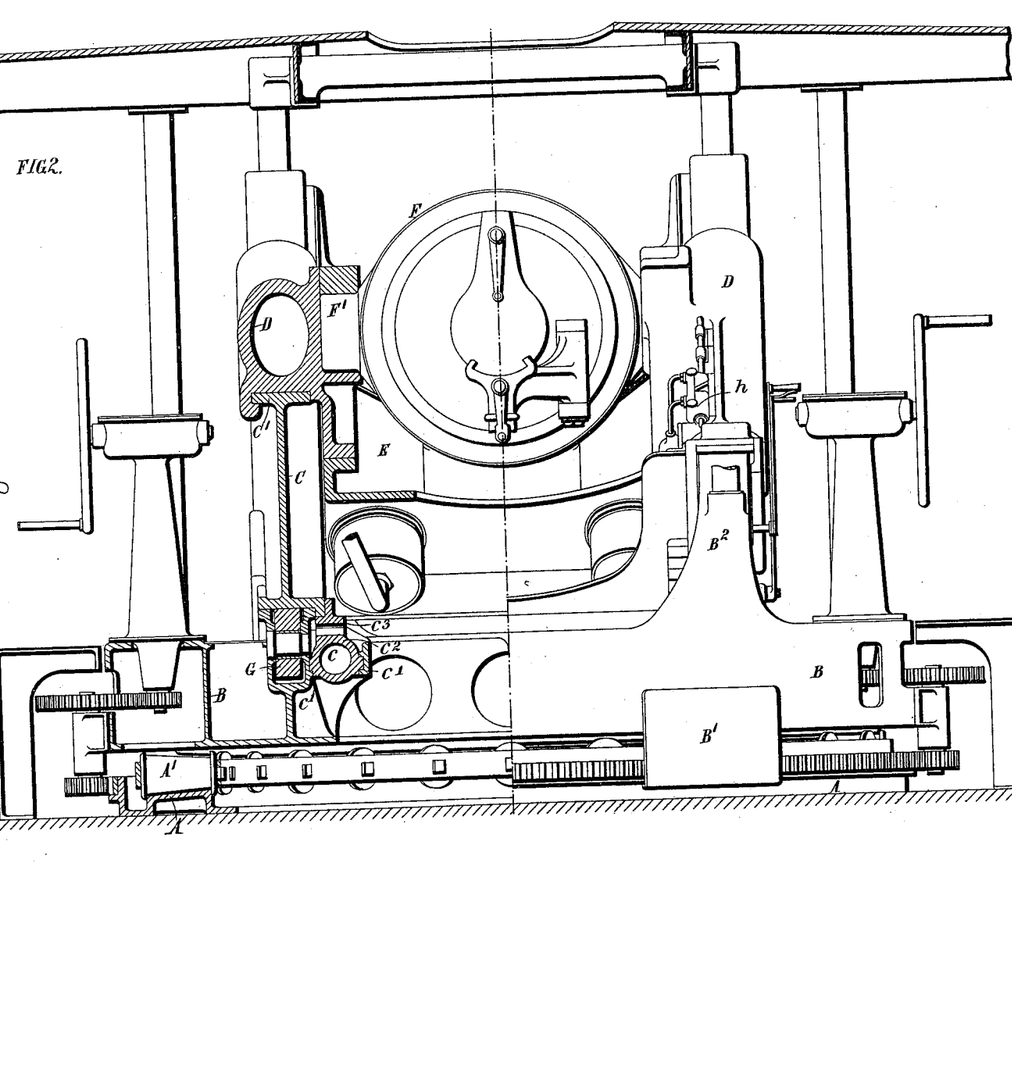
Fig. 2 is a rear view of the said mounting, half being shown in elevation and half in vertical section.

$B^2\ B^2$ are upwardly-projecting sides or cheeks formed on or with the upper face of the turn-table B, and having segmental or arc-shaped surfaces which serve as guides for the segmental frame of the upper carriage. The said frame consists of two segmental cheeks C C, constructed to fit the arc-shaped surfaces of the sides or cheeks $B^2\ B^2$ and rigidly connected. This frame is arranged to oscillate within the cheeks $B^2\ B^2$ about a central line intersected by the longitudinal axis of the gun. The said cheeks C C have on their flat or plane surfaces, which form or lie along the chords of the arcs, flanged faces or slides C', serving as guides for the cradle and recoil-brake cylinders D, which are mounted to slide thereon. The brake-cylinders are rigidly connected together by a transom E, thus forming a cradle, as shown in Fig. 2.

F is the gun, supported by its trunnions F' in suitable bearings formed in the said cradle. The construction of the said cradle is such that the gun can turn on its trunnions through an angle of forty-five degrees, or thereabout—that is to say, from a position where the axis of the gun is parallel with the slides C' to a position where the muzzle of the gun is depressed with respect to the said slides through an angle of about forty-five degrees. In the former position the breech end of the gun rests on beds in the cradle in such a manner that it cannot be elevated any farther unless the cradle also be moved in its arc-shaped bearings.

G G are rollers mounted in the cheeks $B^2\ B^2$ of the turn-table B and arranged to prevent undue friction between the surfaces of the segmental frame and the arc-shaped guides.

H H are other rollers mounted in the cheeks C directly in rear of the recoil-brakes and bearing on the arc-shaped surfaces of the cheeks $B^2\ B^2$, also for the purpose of preventing undue friction. In some cases the rollers H are provided with elastic bearings, which are compressed by the force of recoil and allow the surfaces of the arcs of the upper and lower carriages to come into actual contact when the gun is fired, and so distribute the strain due to recoil over a large surface. After the recoil ceases the said elastic bearings recover their original position and then allow the rollers to act as anti-friction rollers on the arc-shaped bearings, as hereinafter more fully described.

The brake and recuperator apparatus generally are preferably constructed in the manner described in the specification of the aforesaid Patent No. 410,968, of 1889; but for convenience we now prefer to employ two recuperator-cylinders.

For moving the gun about its trunnions from the loading position to the position where it is parallel with the slides C' when the latter are in the position corresponding to the lowest angle of fire, or, in other words, from a horizontal position, or thereabout, to an elevation of about forty-five degrees, any well-known or suitable apparatus may be employed.

Figure 1:
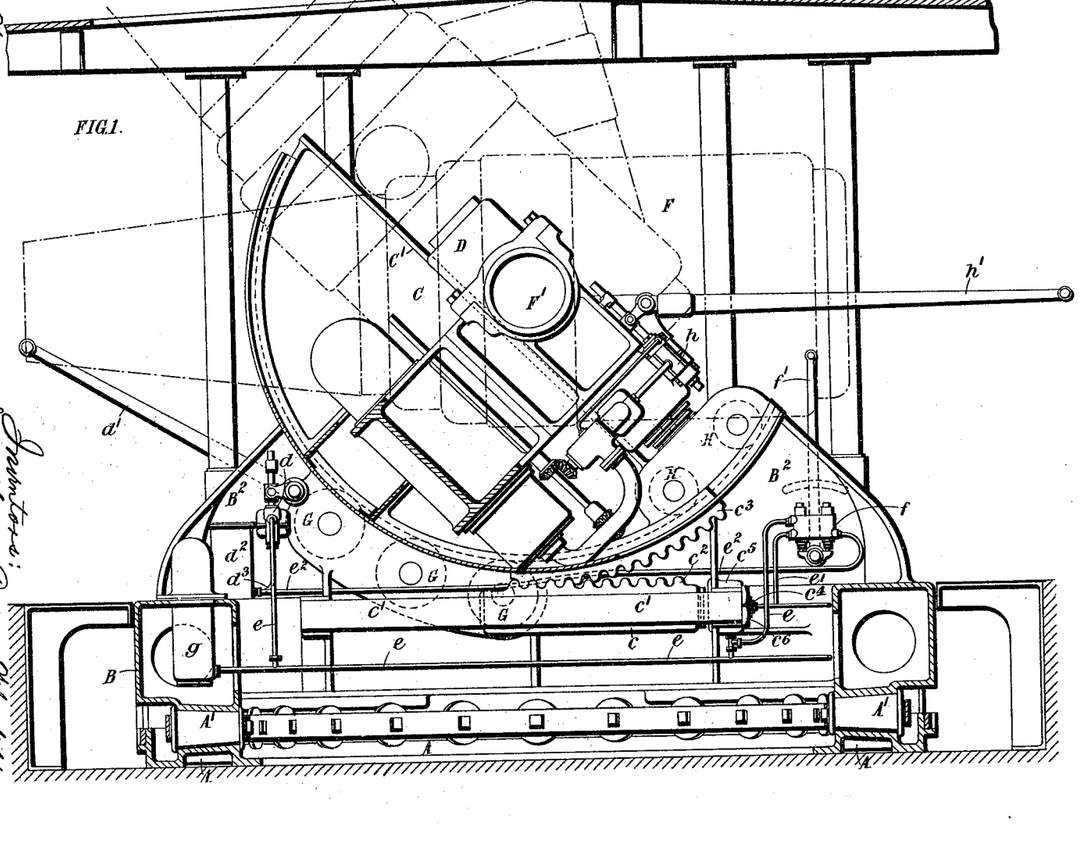
Figure 1 is a longitudinal central section of a gun carriage or mounting constructed according to our said invention, the gun being shown in dotted lines in the loading and lowest and highest firing positions.
Figures 5, 6, 7:
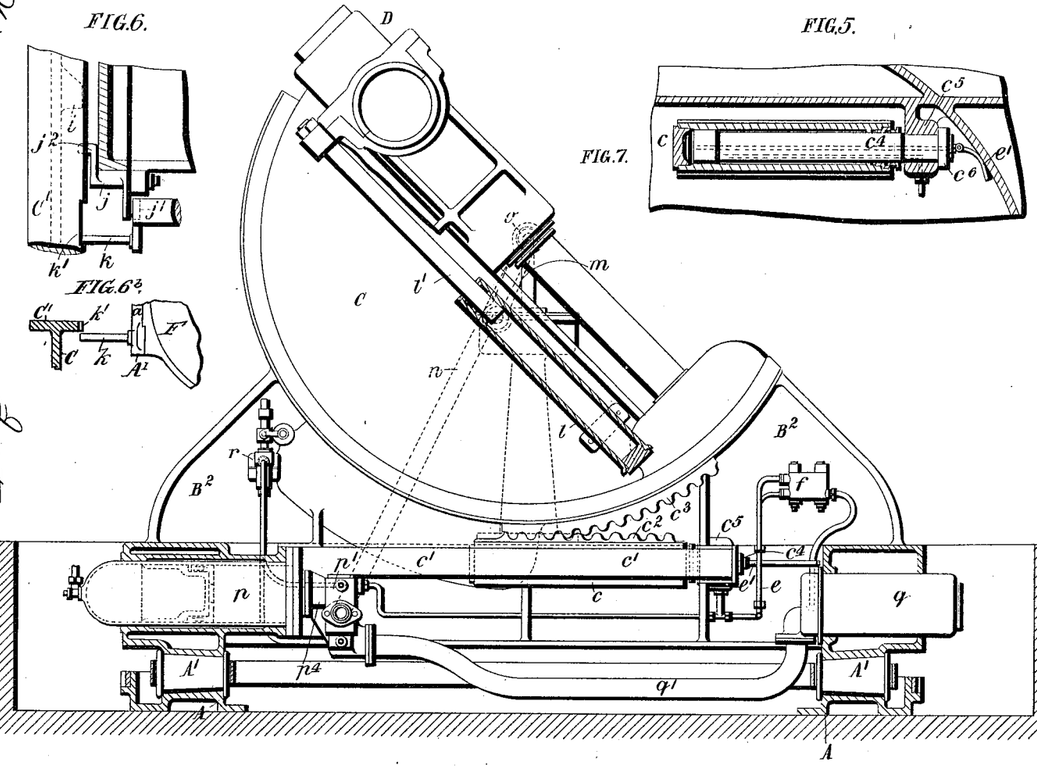
Figure 6:
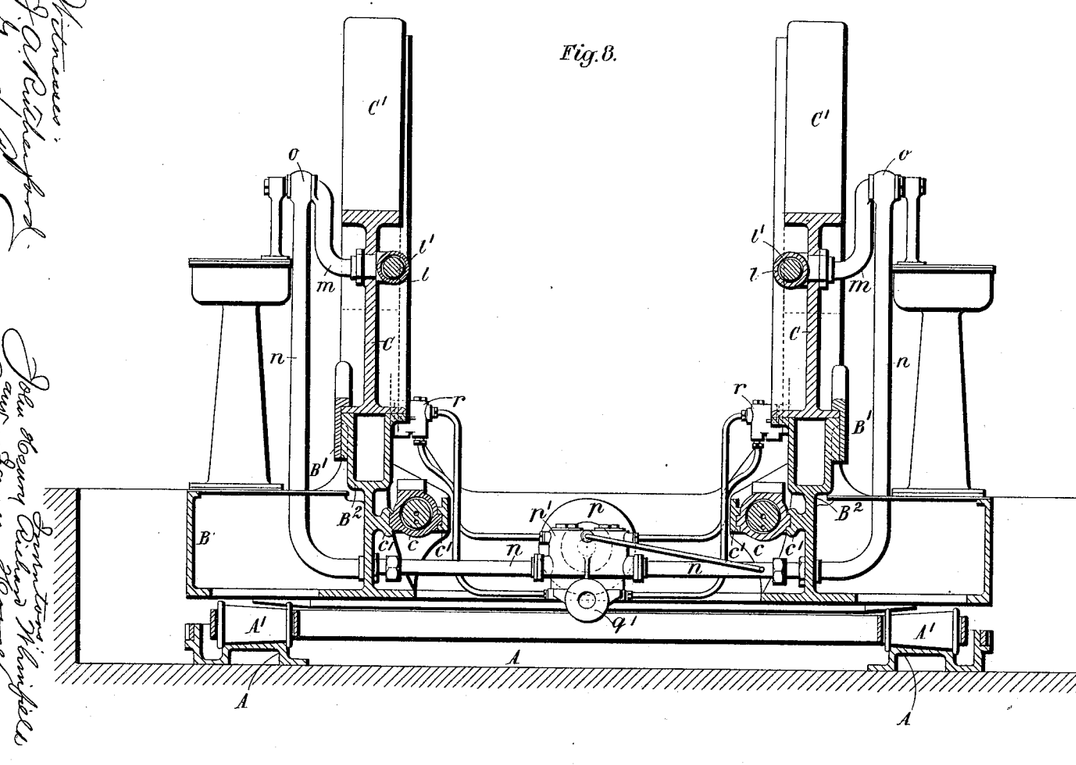
Fig. 6 is a detail view of the locking arrangements hereinafter described.

From the position of lowest angle of fire the gun can only be farther elevated by partially rotating the upper carriage C within its segmental or arc-shaped supports $B^2$. This is effected by gearing or any other suitable means. We prefer, however, to use hydraulic cylinders $c$, Figs. 1 and 2, which are mounted to slide in horizontal guides $c'$, carried by the turn-table and which are provided or formed with racks $c^2$, that gear with segmental racks $c^3$, fixed on or formed with the segments or cheeks of the upper carriage C. The rams or pistons $c^4$ of the hydraulic cylinders (shown more clearly in Fig. 5) are fixed or stationary, being secured at their outer ends in brackets $c^5$ by nuts $c^6$, and the cylinders are movable on the rams. The said cylinders and rams may be of any ordinary or suitable construction. A pump $d$ is provided, preferably, on each side of the gun-mounting and is operated by a handle $d'$ for working the hydraulic cylinders $c$. The said pumps are connected to reservoirs $d^2$ by pipes $d^3$, through which they can draw liquid, which liquid they discharge by the pipes $e$, either into an air or spring accumulator $g$, fixed on the turn-table B, or direct to a distributing-valve $f$, which controls the admission into or discharge of liquid from the said cylinders $c$. When it is required to elevate the gun, the handle $f'$ of the distributing-valve $f$ is moved, so as to admit liquid into the cylinders $c$ through the pipes $e'$. When the gun is to be depressed, the handle $f'$ is suitably moved to allow the liquid to escape from the cylinders $c$, it being forced out when the outlet-passage is opened by reason of the preponderance of the gun or by the constant pressure which is always allowed to act on the small annular space behind the piston to insure the return of the gun in case the preponderance should not be sufficient in all positions. The liquid returns through the pipe $e'$ to the distributing-valve $f$, and thence back to the reservoirs $d^2$ through the pipe $e^2$. To insure rapid service of the gun, the pumps $d$ may be employed to charge the accumulator $g$ while the loading is being performed.

When no accumulator is employed, the pumps cannot be used until the operation of loading is complete, and time is thus lost.

By this apparatus the gun may be rapidly and easily adjusted to any desired angle between the lowest and highest angles of fire, or, say, between the angles of forty-five and seventy-five degrees, or thereabout.

The gun is preferably so mounted that by its own preponderance, whether run in or run out, it will depress the slide to the lowest angle of fire immediately the liquid is allowed to flow from the hydraulic elevating-cylinders. From this position the gun can then be brought to the loading position by means of the hand-wheel $b$ of the apparatus for moving it about its trunnions.

Figures 1A, 6A:
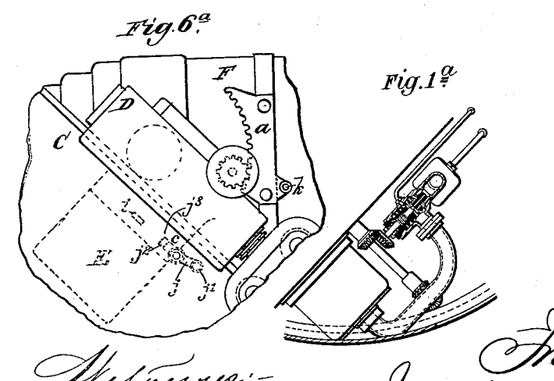

$h$ is a pump operated by a handle $h'$ for running in the gun without firing by pumping the liquid from the brake-cylinders into the recuperator-cylinders, a suitable by-pass valve being arranged, in combination with the non-return valve of the recuperator-cylinders, for permitting the running out of the gun. This by-pass valve is clearly shown in Fig. 1ª.

Figure 3:
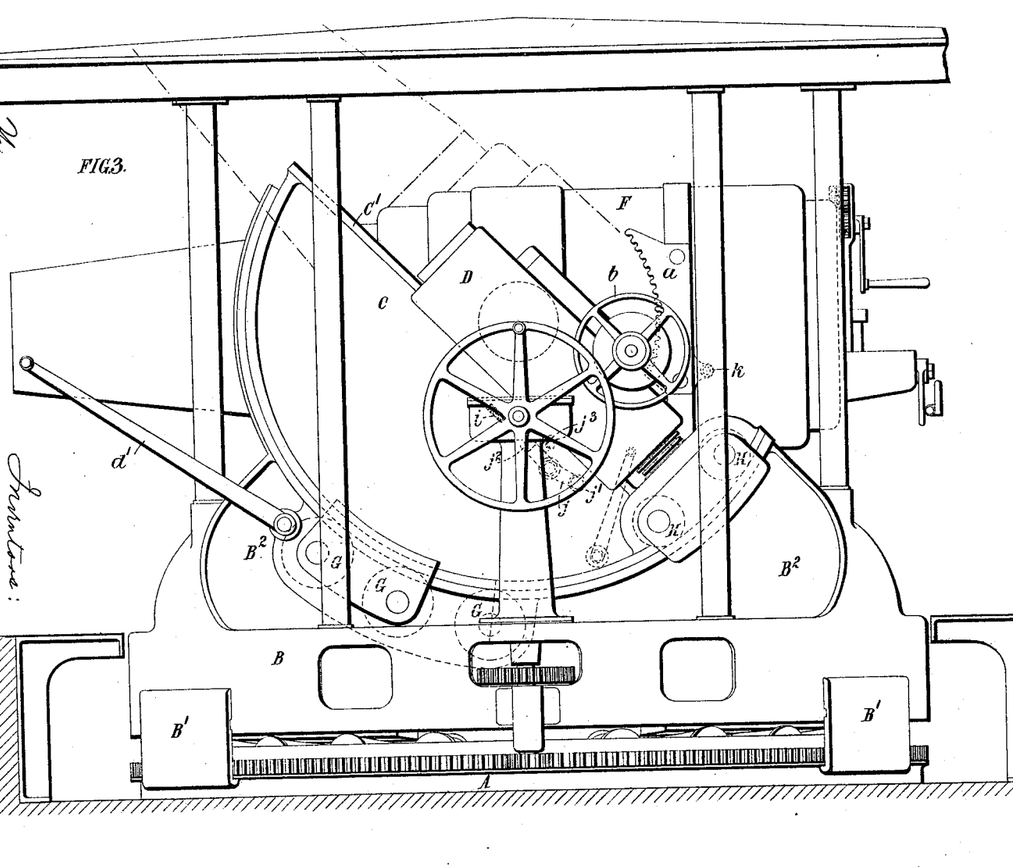
Fig. 3 is a side elevation, and Fig. 4 a plan, of the said carriage or mounting and gun.
Figure 4:
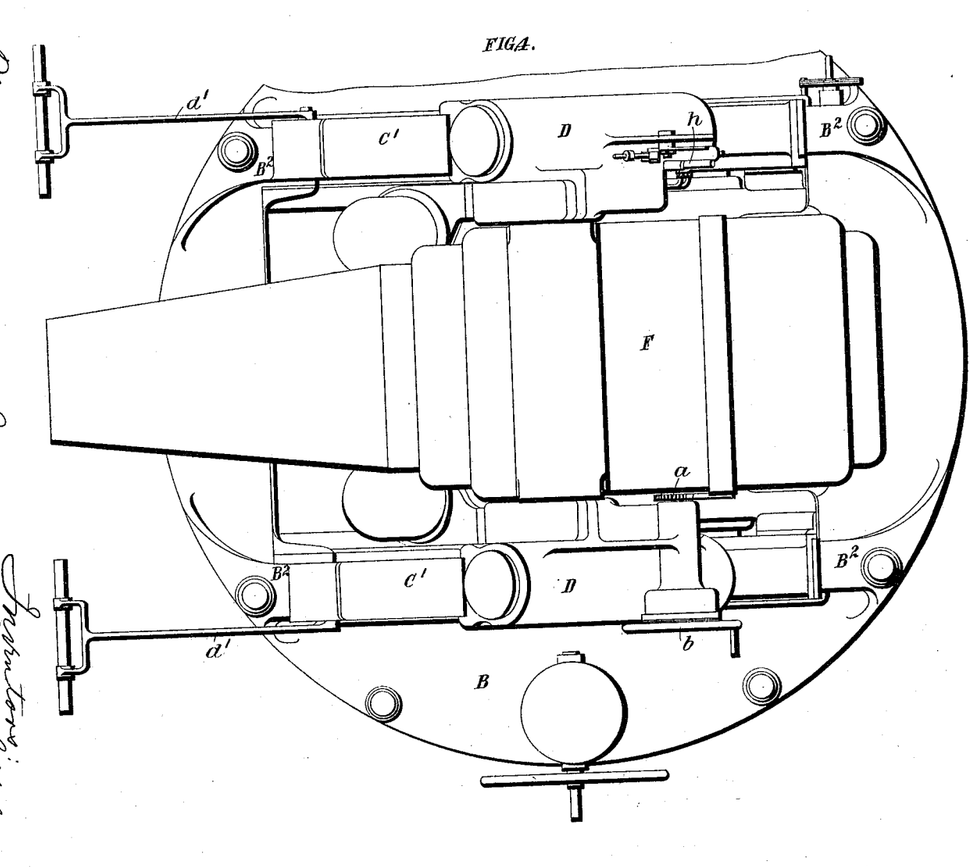

It is desirable to prevent the running out of the gun at any angle of elevation less than that of the lowest firing position. For this purpose we prefer the following arrangement, viz: Secured to or formed with one of the cheeks C is a stop $i$, Figs. 3, 6, and 6ª, and pivoted in a bracket at the rear end of the recoil-cylinder D is a lever $j$, having at one end a roller $j'$ and at the other end a head $j^2$, said head being acted upon by a spring $j^3$ to normally maintain the lever in line with the said stop $i$, in which position the gun cannot be run out. When the gun is properly bedded on the transom, the lower end of the rack $a$ presses on the roller $j$ and lifts the head $j^2$ out of line with the stop $i$. The gun is then free to run out. We also provide the following or other suitable means for preventing the gun being turned about its trunnions to the loading position until it has been run in. $k$ is a bolt or stop which is fixed in the elevating arc $a$ or to the gun and which when the gun is not run in projects beneath the slide C' and serves as a stop which prevents the movement of the gun about its trunnions; but the slide has in it a recess or notch $k'$ in such a position that when the gun is run in the said bolt $k$ can rise through the notch $k'$, and the gun may then be moved about its trunnions to the loading position.

The mode of operation of our improved elevating apparatus may be briefly described as follows: The slides C' of the upper carriage are not brought to a lower angle of elevation than forty-five degrees (or whatever angle is fixed upon for the lowest angle of fire) with the horizontal. Therefore it is obvious from the above description that the work of elevating the gun to its firing position is divided into two operations—viz., the first, wherein the gun is moved independently about its trunnions, and the second, wherein it is moved with the top carriage. The gun being so constructed and arranged on its trunnions that when loaded it is nearly evenly balanced therein and very little force is required to move it about its trunnions. The gun itself is independently rotated about its trunnions by means of suitable hand-gear to bring it from this angle to the horizontal or loading position. When the loading has been effected, the gun is again elevated first by turning it about its trunnions to the lowest angle of fire by the hand-gear and then for further elevation by turning it with the upper carriage by means of the hydraulic apparatus above described. The return movement of the gun and segmental frame is effected by the preponderance of the gun and carriage when the liquid in the hydraulic cylinders $c$ is allowed to escape until the slide is brought to the lowest angle of fire. From this position the gun is brought to the horizontal or loading position by turning it about its trunnions by means of the hand-gear; but, as above described, the gun is prevented by suitable automatic locking-gear from turning on its trunnions until it is run in and the gun cannot be run out until elevated to the lowest angle of fire.

Figure 8A:
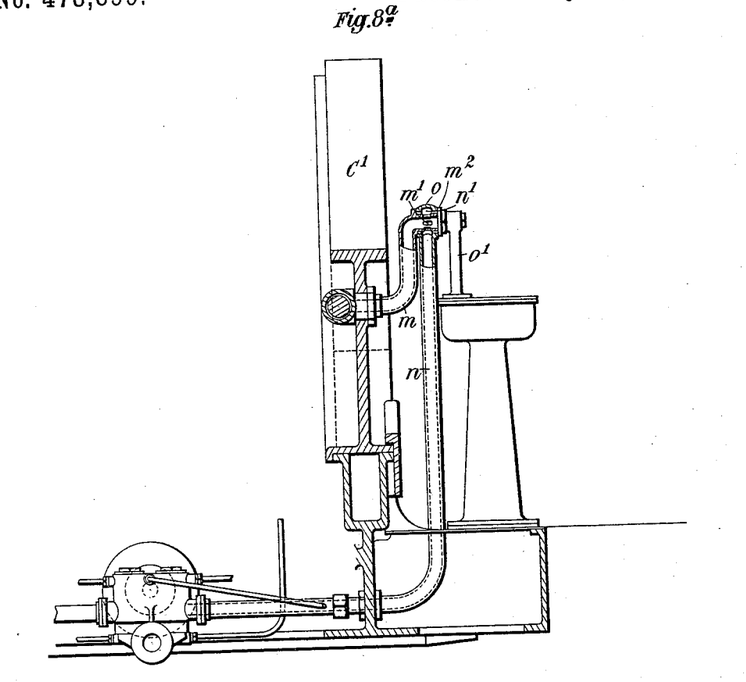
Figure 9:
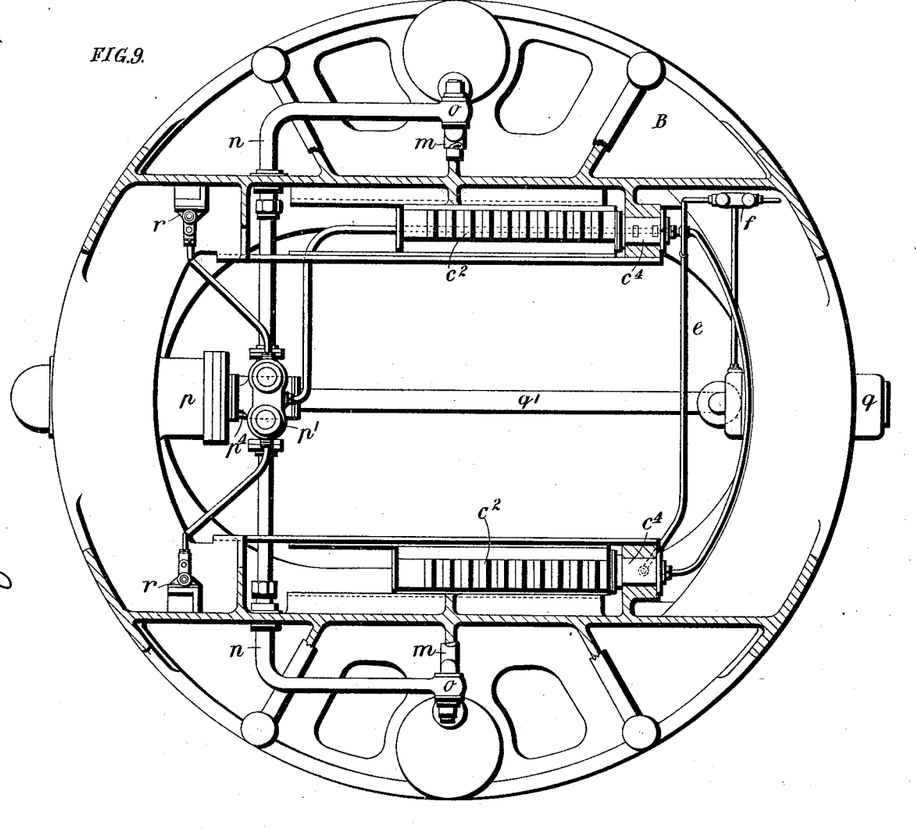

In a modification of our invention shown in Figs. 7 to 10 we provide for actuating the elevating-cylinders by energy due to the recoil. For this purpose we provide auxiliary cylinders $l$, which are mounted on the upper carriage and within which work rams $l'$, attached to the gun-cradle. Pipes $m$ $n$, having swivel-joints at $o$, which lie in the center or axis of oscillation of the carriage, connect the said auxiliary cylinders to a double valve-box $p'$, attached to an air or spring accumulator $p$, fixed on the turn-table B. The valve-box $p'$ is also connected by a pipe $q'$ to a reservoir $q$ open to the atmosphere. The construction of this valve-box is shown clearly in Fig. 10. The construction of the swivel-joint $o$ is shown in Fig. 8ª. The pipe $n$ has an enlargement at its end forming an eye-piece or socket to receive the end of the pipe $m$, which is provided with holes $m'$, that form communications between the pipe $m$ and an annular space $n'$ in the eye or socket of the pipe $n$, however the formed pipe may be turned. A screw-cap $m^2$ closes the end of the pipe $m$, and the joint is supported by a standard $o'$. The pipe $m$ is secured to the cylinder $l$ by bolts or in any well-known or suitable manner. When the gun is running out and rams $l'$ are being withdrawn from the cylinders $l$, thus causing or tending to cause a vacuum therein, the atmosphere, acting on the liquid in the reservoir $q$, forces the same through the pipe $q'$ and lifts the lower non-return valves $p^2$ of the valve-box $p'$. The liquid then rises through the pipes $n$ $m$ into the cylinders $l$, following up the rams $l'$ as they are withdrawn. Thus when the gun is run out the cylinders $l$ are fully charged with liquid. The said lower valves of the valve-box $p'$ then immediately close and prevent the liquid returning to the reservoir $q$. On the gun being fired the rams $l'$ are forced into the cylinders $l$ and the liquid thereby expelled through the pipes $m$ $n$ and through the upper non-return valves $p^2$ of the valve-box $p'$ into the accumulator $p$ by the connection $p^4$ compressing the air or spring, and thereby storing sufficient power to quickly manipulate the hydraulic cylinders $c$, with which the said accumulator is connected. Hand-pumps $r$ may also be used to charge the accumulator $p$. The connections from the accumulator to the distributing-valve $f$ and to the hydraulic elevating-cylinders $c$ are similar to those above described. In some cases flexible pipes, sufficiently strong to withstand the pressure, may be used instead of jointed pipes $m$ $n$, as shown.

Figures 10, 12, 13:
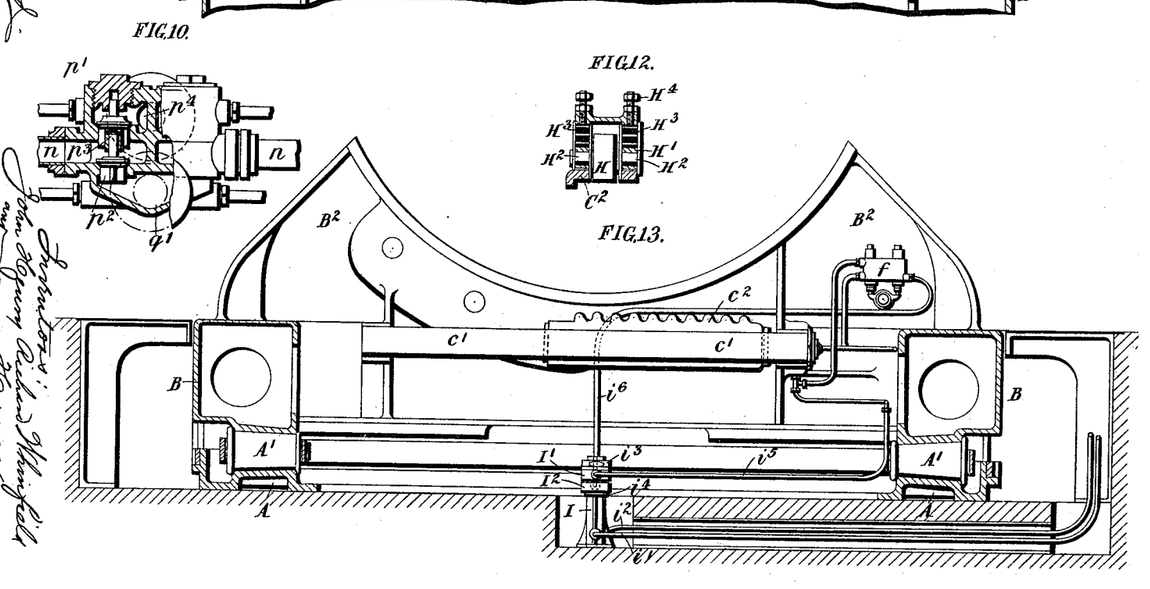
Fig. 10 is a detail view, partly in vertical section, of a valve-box hereinafter described.
Fig. 12 is a section on the line $y\ y$, Fig. 11.
Fig. 13 is a vertical central section through the turn-table showing a center pivot-pipe and connections hereinafter described.
Figure 11:
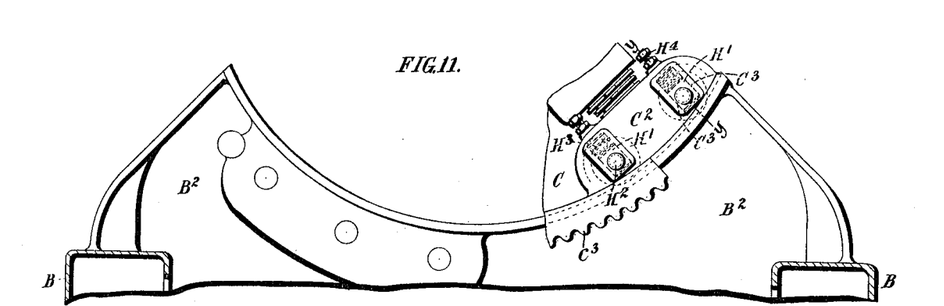
Fig. 11 is a detail view showing rollers mounted in elastic bearings hereinafter described.

In Figs. 11 and 12 we have shown detailed views of elastic bearings suitable for the rollers H. $C^2$ $C^2$ are brackets formed with or attached to the rear ends of the cheeks C and provided with rectangular bearing-recesses $C^3$, in which are fitted to slide bearing-blocks $H'$. Either the axles $H^2$ of the rollers H are secured to the said rollers and revolve in the blocks $H'$, or they are secured to the blocks $H'$ and the rollers H revolve upon them. In the recesses $C^3$ are fitted strong springs $H^3$ of any suitable shape, which act to press the rollers H against the arc-shaped roller path or bearing-surface of the cheeks $B^2$. The said springs are adjusted by screws $H^4$ to have sufficient initial compression to support the segmental frame clear of the arc-shaped bearing-surfaces, except when the same is under the stress of recoil, at which time the springs will yield and allow the faces of the two arcs to come into contact.

In cases where hydraulic power is available from an external source, the pumps and accumulators may be dispensed with and the elevating-cylinders may be operated through suitable distributing-valves, the water being conveyed to the under carriage through a center pivot-pipe. In Fig. 13 we have shown the arrangements we prefer to employ for this purpose. I is a center pivot-pipe placed below the gun-mounting and consisting of a fixed central stem divided by an internal vertical web into two compartments, which are provided the one with an inlet-pipe $i'$ for the service-water and the other with an outlet-pipe $i^2$ for the exhaust. Surrounding the stem are two collars $I'$ $I^2$, which are capable of rotating on the stem between fixed collars $i^3$ $i^4$ and which are provided with internal circumferential recesses or channels. Suitable ports are formed in the stem for connecting the recess or channel of one collar with one division or compartment of the pivot-pipe and that of the other collar to the other compartment of the pivot-pipe, and leather or other rings are placed between each fixed collar $i^3$ $i^4$ and the adjacent rotating collar and also between the two rotating collars to prevent leakage. Moreover, suitable pipes $i^5$ $i^6$ connect the said movable collars to the service and exhaust openings, respectively, of the distributing-valve $f$, as in the arrangements above described.

Although we have described and illustrated our invention as applicable to a breech-loading gun, it is obvious that it is equally applicable to a muzzle-loading gun.

We are aware that gun-mountings for turrets have been constructed with a pivoted slide for the purpose of raising and lowering the trunnions of the gun to allow of the use of a small port-hole with a large vertical arc of fire; but in this case the gun does not recoil in the line of fire. In our gun-mounting, however, the gun always recoils in the line of fire at all firing angles.

Our improved carriage or mounting is sometimes arranged with an overhead shield, so that it may be placed in a pit, if desired, and this shield may be provided with runner-ways, tackle, or other suitable apparatus for raising the ammunition to facilitate the loading of the gun, or a davit may be carried upon the mounting for this purpose. The training may be effected by any ordinary and suitable means.

What we claim is—

1. In a gun-mounting, the combination, with a base-plate, a turn-table mounted thereon and having arc-shaped guide-cheeks projecting therefrom, and a segmental upper carriage provided with slides, of a gun-cradle mounted on said slides, a gun trunnioned in said cradle, mechanism for elevating said gun independent of said segmental upper carriage to a degree limited by the gun-cradle, and mechanism for oscillating said upper carriage and gun in unison to a further degree of elevation, substantially as described.

2. In a gun-mounting, the combination, with a base-plate, a turn-table mounted thereon and having arc-shaped guide-cheeks projecting therefrom, and a segmental upper carriage provided with slides, of a gun-cradle mounted on said slides and provided with recoil-brakes and recuperator apparatus, rack-and-gear mechanism for elevating said gun to a degree limited by the gun-cradle, and mechanism for oscillating said upper carriage and gun in unison to a further degree of elevation, substantially as described.

3. A gun-mounting for high-angled fire, comprising, in combination with each other, a base-plate or roller path A, a turn-table B, mounted thereon and having arc-shaped guide-cheeks $B^2$ projecting therefrom, an upper carriage C, mounted within the guide-cheeks $B^2$ and having slides $C'$, a cradle comprising the brake-cylinders D and transom E, mounted on the slides $C'$ and having bearings for the trunnions of the gun, the said cradle being so constructed as to prevent the gun being turned or elevated to a higher angle than that of the slide $C'$, and a hydraulic cylinder $c$, provided with suitable inlet and outlet pipes and with a rack $c^2$, gearing with a toothed segment $c^3$, fixed on the upper carriage C, and a pump $d$, connected to the said inlet-pipes, whereby the said carriage may be actuated and caused to oscillate between the lowest and highest angles of fire, substantially as described.

4. A gun-mounting for high-angled fire, comprising, in combination with each other, a base-plate or roller path A, a turn-table B, mounted thereon and having arc-shaped guide-cheeks $B^2$ projecting therefrom, an upper carriage C, mounted within the guide-cheeks $B^2$ and having slides C', a cradle comprising the brake-cylinders D and transom E, mounted on the slides C' and having bearings for the trunnions of the gun, the said cradle being so constructed as to prevent the gun being turned or elevated to a higher angle than that of the slide C', and a hydraulic cylinder $c$, provided with a rack $c^2$, gearing with a toothed segment $c^3$, fixed on the upper carriage C and with suitable inlet and outlet pipes, a pump $d$, connected to the said inlet-pipes, and an accumulator $g$ and distributing-valve $f$, substantially as described, and for the purpose specified.

5. A gun-mounting for high-angled fire, comprising, in combination with each other, a base-plate or roller path A, a turn-table B, mounted thereon and having arc-shaped guide-cheeks $B^2$ projecting therefrom, an upper carriage C, mounted within the guide-cheeks $B^2$ and having slides C', a cradle comprising the brake-cylinders D and transom E, mounted on the slides C' and having bearings for the trunnions of the gun, the said cradle being so constructed as to prevent the gun being turned or elevated to a higher angle than that of the slides C', and a hydraulic cylinder $c$, provided with a rack $c^2$, gearing with a toothed segment $c^3$, fixed on the upper carriage C, and with suitable inlet and outlet pipes, the former connecting the said cylinder to an external source of hydraulic power or liquid supply through the center pivot-pipe I of the gun-mounting, and a distributing-valve $f$, substantially as and for the purpose above described.

6. The combination, with the gun, its cradle, and upper carriage, of a stop $i$, fixed on the said upper carriage, a lever $j$, pivoted to the gun-cradle, a spring $j^3$, connected to the lever $j$ and to the cradle, and an arc or projection $a$, secured to the gun, substantially as described, and shown in the drawings, and for the purpose specified.

7. The combination, with the gun, the cradle, and the upper carriage, of a bolt or stop $k$, fixed to the gun, and a recess $k'$, formed in one of the slides C', substantially as described, and shown in the drawings, and for the purpose specified.

8. The combination, with the gun-cradle, the upper carriage, and the arc-shaped bearings $B^2$, of rollers H, mounted in the said upper carriage directly in rear of the recoil-brake apparatus and provided with elastic bearings, substantially as and for the purpose specified.

9. For actuating the elevating-cylinders by energy derived from the recoil, the apparatus comprising the auxiliary cylinders $l$, mounted on the upper carriage, rams $l'$, working therein and secured to the gun-cradle, the valve-box $p'$, connected to the cylinders $l$, the reservoir $q$ and accumulator $p$, connected to the said valve-box, and suitable inlet and outlet pipes forming communications between the said accumulator and the elevating-cylinders, substantially as above described, and shown in the drawings.

10. For actuating the elevating-cylinders by energy derived from the recoil, the apparatus comprising the auxiliary cylinders $l$, mounted on the upper carriage, rams $l'$, working therein and secured to the gun-cradle, the valve-box $p'$, connected to the cylinders $l$ by means of pipes $m$ $n$, having a swivel-joint at $o$, reservoir $q$ and accumulator $p$, connected to the said valve-box, distributing valve $f$, and suitable inlet and outlet pipes forming communications between the said accumulator and the elevating-cylinders, substantially as above described, and shown in the drawings.

In testimony whereof we have hereunto signed our names in the presence of two subscribing witnesses.

JOHN HENRY RICHARD WHINFIELD.
JAMES HORNE.

Witnesses:
GEORGE HARRISON,
W. A. JACKSON.